United States Patent
Senter et al.

(10) Patent No.: US 10,405,530 B2
(45) Date of Patent: *Sep. 10, 2019

(54) ILLUMINATED SPINNERBAIT FISHING LURE

(71) Applicant: R2 Innovations, LLC, Englewood, CO (US)

(72) Inventors: Robert L. Senter, Castle Rock, CO (US); Robert E. Matuszewski, Castle Rock, CO (US)

(73) Assignee: R2 Innovations, LLC, Castle Rock, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/710,670

(22) Filed: Sep. 20, 2017

(65) Prior Publication Data
US 2018/0007876 A1   Jan. 11, 2018

Related U.S. Application Data

(63) Continuation-in-part of application No. 13/739,626, filed on Jan. 11, 2013, now Pat. No. 9,795,122, which is a continuation-in-part of application No. 13/296,517, filed on Nov. 15, 2011, now Pat. No. 9,282,730.

(60) Provisional application No. 61/586,504, filed on Jan. 13, 2012.

(51) Int. Cl.
| A01K 85/01 | (2006.01) |
| A01K 85/14 | (2006.01) |
| A01K 85/10 | (2006.01) |

(52) U.S. Cl.
CPC .............. *A01K 85/01* (2013.01); *A01K 85/10* (2013.01); *A01K 85/14* (2013.01)

(58) Field of Classification Search
CPC ........ A01K 85/01; A01K 85/02; A01K 85/10; A01K 93/00
See application file for complete search history.

(56) References Cited

U.S. PATENT DOCUMENTS

| 3,213,562 | A | * | 10/1965 | Salvin | A01K 85/01 43/17.6 |
| 3,608,228 | A | * | 9/1971 | Borresen et al. | A01K 85/01 43/17.6 |
| 3,940,868 | A | * | 3/1976 | Northcutt | A01K 85/01 43/17.6 |
| 4,085,538 | A | * | 4/1978 | Jankowski | A01K 85/01 43/17.6 |
| 4,426,803 | A | * | 1/1984 | Helling | A01K 85/01 43/17.6 |
| 4,486,969 | A | * | 12/1984 | Swenson | A01K 93/02 43/17 |
| 4,693,032 | A | * | 9/1987 | Mattison | A01K 85/01 43/17.6 |
| 4,757,632 | A | * | 7/1988 | Grobl | A01K 85/01 43/17.6 |

(Continued)

*Primary Examiner* — Michael H Wang

(57) ABSTRACT

Spinnerbait fishing lures equipped with one or more light sources interacting and/or interfacing with one or more polymer light transmission mediums are described herein. The light source optically coupled to the polymer light transmission medium acts to illuminate one or more areas of the spinnerbait lure to enhance the effect of the fishing lure to maintain its color, color pattern and iridescence.

20 Claims, 8 Drawing Sheets

(56) References Cited

U.S. PATENT DOCUMENTS

| | | | | |
|---|---|---|---|---|
| 5,084,996 A * | 2/1992 | Woodruff | A01K 85/14 | 43/42.33 |
| 5,113,606 A * | 5/1992 | Rinker | A01K 85/10 | 43/42.06 |
| 5,157,857 A * | 10/1992 | Livingston | A01K 85/01 | 43/17 |
| 5,299,107 A * | 3/1994 | Ratcliffe | A01K 85/01 | 200/220 |
| 5,381,621 A * | 1/1995 | Fuller | A01K 85/00 | 43/42.11 |
| 5,392,555 A * | 2/1995 | Tingey | A01K 85/01 | 43/17.6 |
| 5,495,690 A * | 3/1996 | Hunt | A01K 85/01 | 43/17.6 |
| 5,758,450 A * | 6/1998 | Young | A01K 85/01 | 43/17.6 |
| 5,915,941 A * | 6/1999 | Casey | A01K 93/02 | 43/17.5 |
| 5,974,721 A * | 11/1999 | Johnson | A01K 93/02 | 43/17 |
| 6,029,388 A * | 2/2000 | Yokogawa | A01K 85/01 | 43/17.5 |
| 6,131,329 A * | 10/2000 | Kageyama | A01K 85/10 | 43/42.33 |
| 6,318,016 B1 * | 11/2001 | Ellig | A01K 85/01 | 43/17.6 |
| 6,336,288 B1 * | 1/2002 | Foss | A01K 85/01 | 43/17.6 |
| 6,647,659 B1 * | 11/2003 | King | A01K 85/01 | 43/17.6 |
| 6,671,995 B1 * | 1/2004 | Harkin | A01K 85/01 | 43/17.5 |
| 6,796,077 B1 * | 9/2004 | Dupree | A01K 85/01 | 43/17.6 |
| 6,922,935 B2 * | 8/2005 | Yu | A01K 85/01 | 43/17.6 |
| 7,107,717 B2 * | 9/2006 | Pelegrin | A01K 85/00 | 43/17.6 |
| 7,114,280 B2 * | 10/2006 | Turner | A01K 85/01 | 43/17.6 |
| 7,562,489 B2 * | 7/2009 | Turner | A01K 85/01 | 43/17.6 |
| 7,707,764 B1 * | 5/2010 | Osburn | A01K 85/01 | 43/17.5 |
| 7,803,360 B2 * | 9/2010 | Hanson | A01K 85/00 | 424/84 |
| 8,061,075 B2 * | 11/2011 | Herrick | A01K 85/01 | 43/17.6 |
| 8,091,270 B2 * | 1/2012 | Senter | A01K 85/00 | 43/17.6 |
| 9,675,056 B2 * | 6/2017 | Senter | A01K 85/01 | |
| 2004/0111950 A1 * | 6/2004 | Lindgren | A01K 85/01 | 43/17.5 |
| 2006/0000138 A1 * | 1/2006 | Druk | A01K 85/01 | 43/42.09 |
| 2009/0223109 A1 * | 9/2009 | Makowski | A01K 91/06 | 43/17.6 |
| 2011/0099882 A1 * | 5/2011 | Young | A01K 85/01 | 43/17.6 |
| 2011/0247260 A1 * | 10/2011 | Schwartz | A01K 85/01 | 43/42.31 |
| 2014/0366426 A1 * | 12/2014 | Dyer | A01K 91/06 | 43/17.5 |

\* cited by examiner

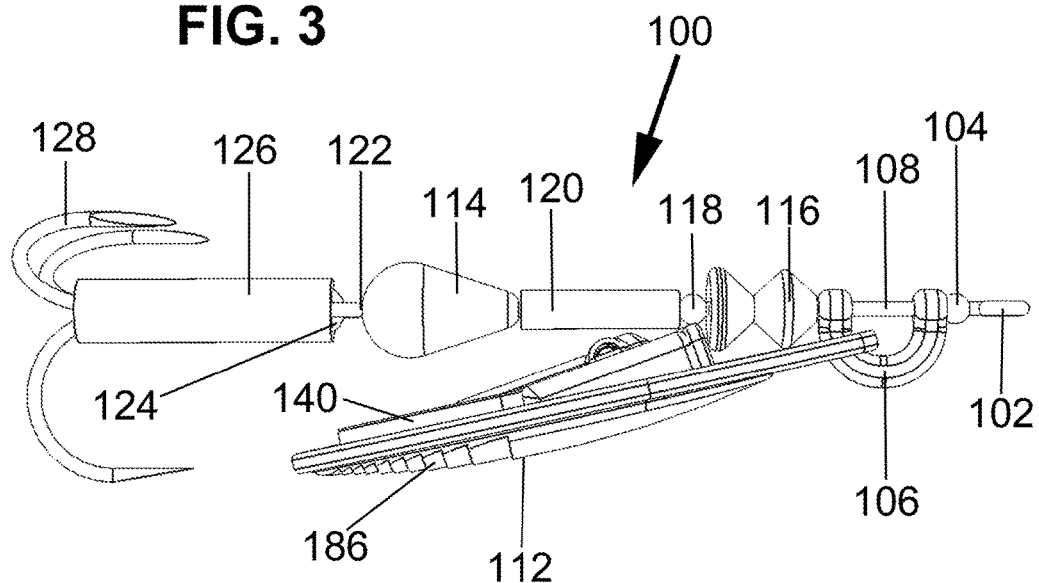
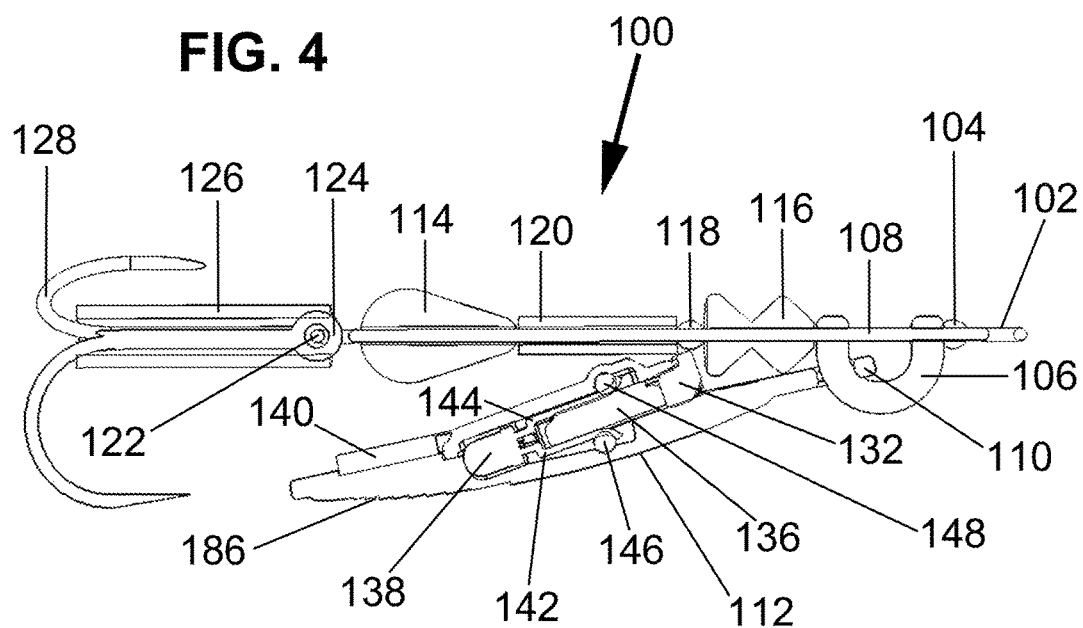

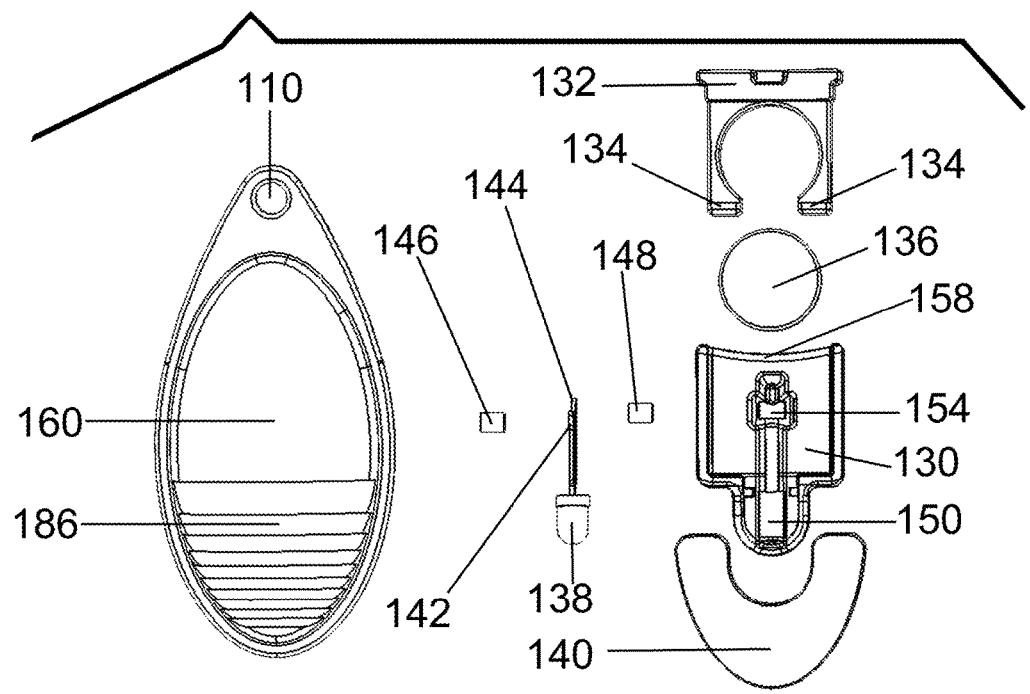
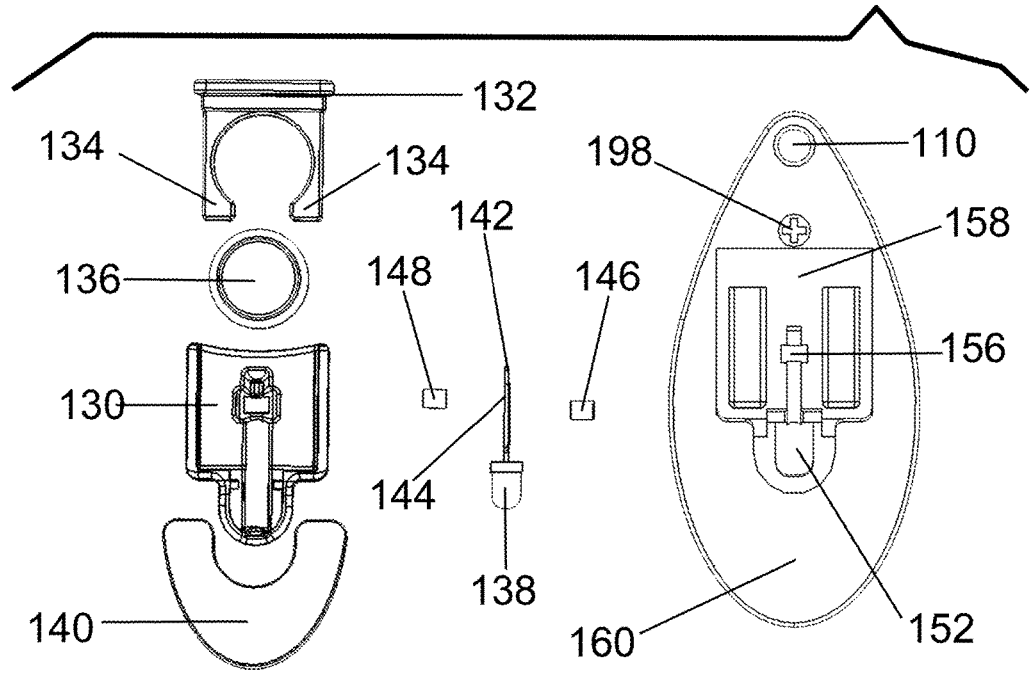

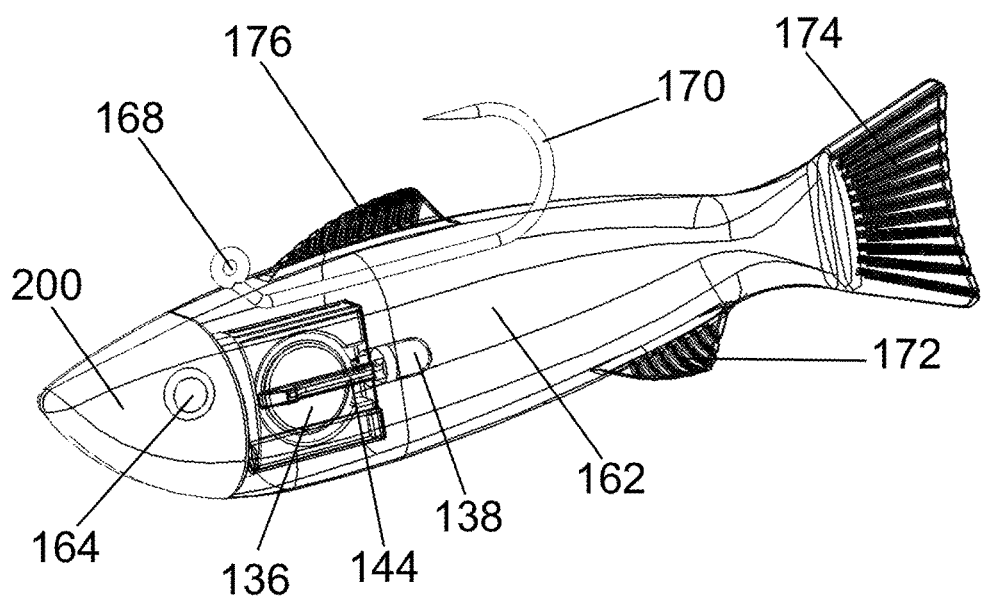
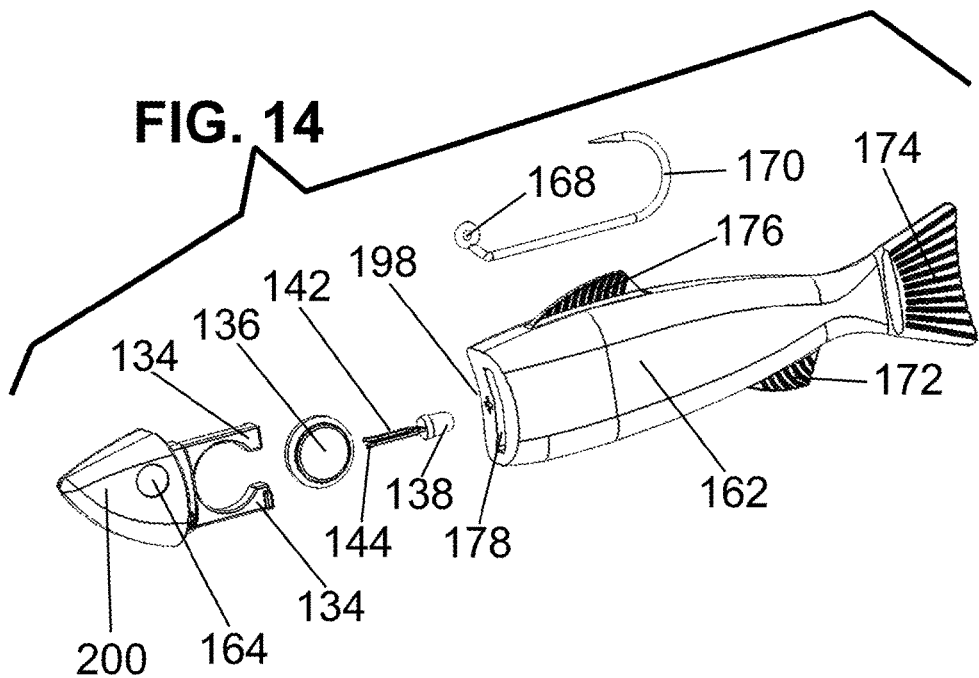

ILLUMINATED SPINNERBAIT FISHING LURE

CROSS REFERENCE TO RELATED APPLICATIONS

This application is a continuation of and claims priority to U.S. patent application Ser. No. 13/739,626, filed on Jan. 11, 2013, and entitled "ILLUMINATED SPINNERBAIT FISHING LURE," which itself claims priority to Provisional Patent Application No. 61/586,504 filed Jan. 13, 2012, entitled "ILLUMINATED SPINNERBAIT FISHING LURE," and is a continuation in part of, patent application Ser. No. 13/296,517 entitled "ILLUMINATED FISHING LURE," filed Nov. 15, 2011, all of which are incorporated by reference for all purposes.

BACKGROUND

Technical Field

Aspects of the disclosure relate generally to fishing equipment, and more particularly to maintaining the color, color pattern and iridescence to Spinnerbait fishing lures.

Technical Background

Salt water and fresh water spinnerbait fishing lures adapted to ensnare fish or other prey are known in the art. Spinnerbait fishing lures are a type of fishing lure equipped with at least one or more rotating blades. The rotation of the blade as the spinnerbait fishing lure is in motion produces vibrations and sound patterns in the water that mimics small fish or other prey. The angler can control the direction and action of the spinnerbait fishing lure with the use of a fishing rod and reel.

Overview

Aspects of the present disclosure relate to spinnerbait fishing lures equipped with one or more light sources that interact and/or interface with one or more polymer light transmission mediums. The light source can be embedded in or located proximate to the polymer light transmission medium to amplify, intensify, and/or disperse light along the polymer light transmission medium to maintain the color, color pattern and iridescence of the spinnerbait fishing lure. It should be realized that the use of an LED or other appropriate light source may not be intended or utilized for the purpose of attracting a fish to strike. The LED or light source may be employed to provide illumination through the polymer transmission medium to maintain the color, color pattern and iridescence of the spinnerbait fishing lure to overcome the adverse affects of loss of light once the spinnerbait lure enters the water.

In one aspect of the invention, an in-line spinnerbait lure includes a hook and polymer light transmission medium spinner blade; a light source optically coupled to the spinner blade and a power source electrically coupled with the light source.

In another form of the invention, an in-line spinnerbait lure includes a hook, rotating blade and polymer light transmission medium fish body; a light source optically coupled with the polymer light transmission medium fish body and a power source electrically coupled with the light source.

In another example, a safety-pin or overhead style spinnerbait lure includes; a polymer light transmission spinnerbait blade, a metal blade, a polymer light transmission medium fish body; a light source optically coupled with the polymer light transmitting spinner blade and a light source optically coupled to the polymer light transmission fish body and a power source electrically coupled with each light source.

In yet another form of the invention, not depicted in the diagrams, the polymer light transmission spinnerbait blade may be attached separately to an umbrella fishing rig, a fishing trailer rig, a fishing spinner harness or a safety-pin spinnerbait lure.

The features, utilities, and advantages of the various embodiments of the present invention will be apparent from the following more particular descriptions of the embodiments of the invention as illustrated in the accompanying drawings and defined in the appended claims.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 3 is a front side horizontal view of the spinnerbait fishing lure depicted in FIG. 1.

FIG. 4 is a front side horizontal cross-sectional view of the fishing lure depicted in FIG. 3.

FIG. 8 is an exploded front view shown in FIG. 5.

FIG. 9 is an exploded back view shown in FIG. 5.

FIG. 13 is an isometric transparent view of a spinnerbait detachable polymer light transmission medium fish body including an illumination system.

FIG. 14 is an exploded isometric view of FIG. 13.

DETAILED DESCRIPTION

Figure 1:
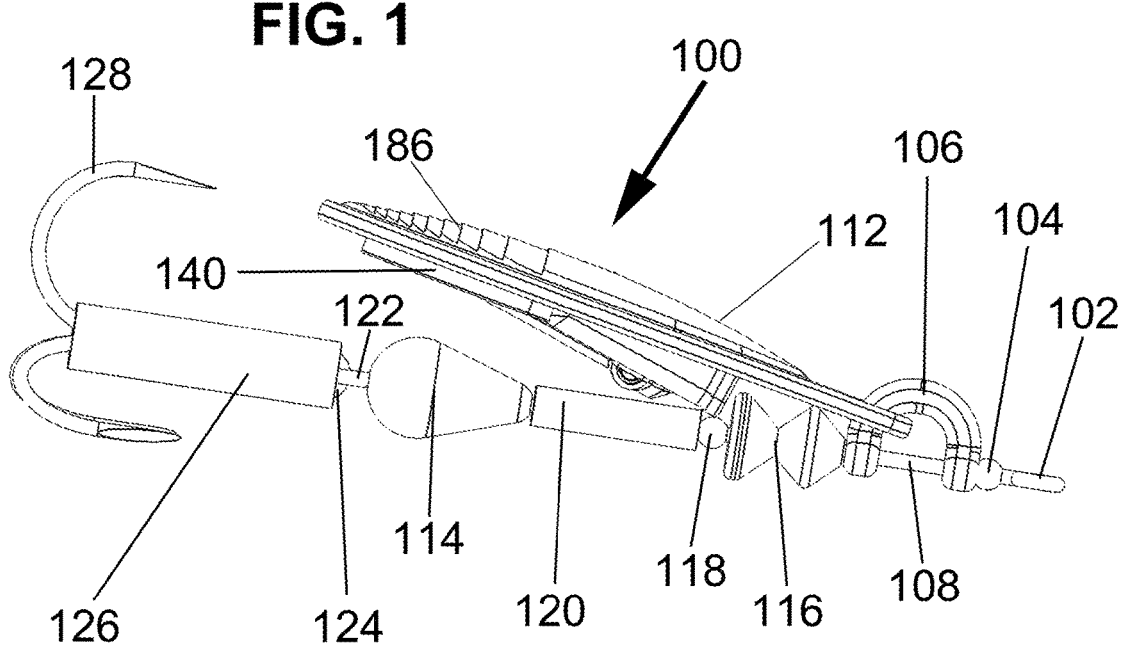
FIG. 1 is an isometric view of a first embodiment of a spinnerbait fishing lure including a polymer light transmission spinner blade and illumination system.
Figure 2:
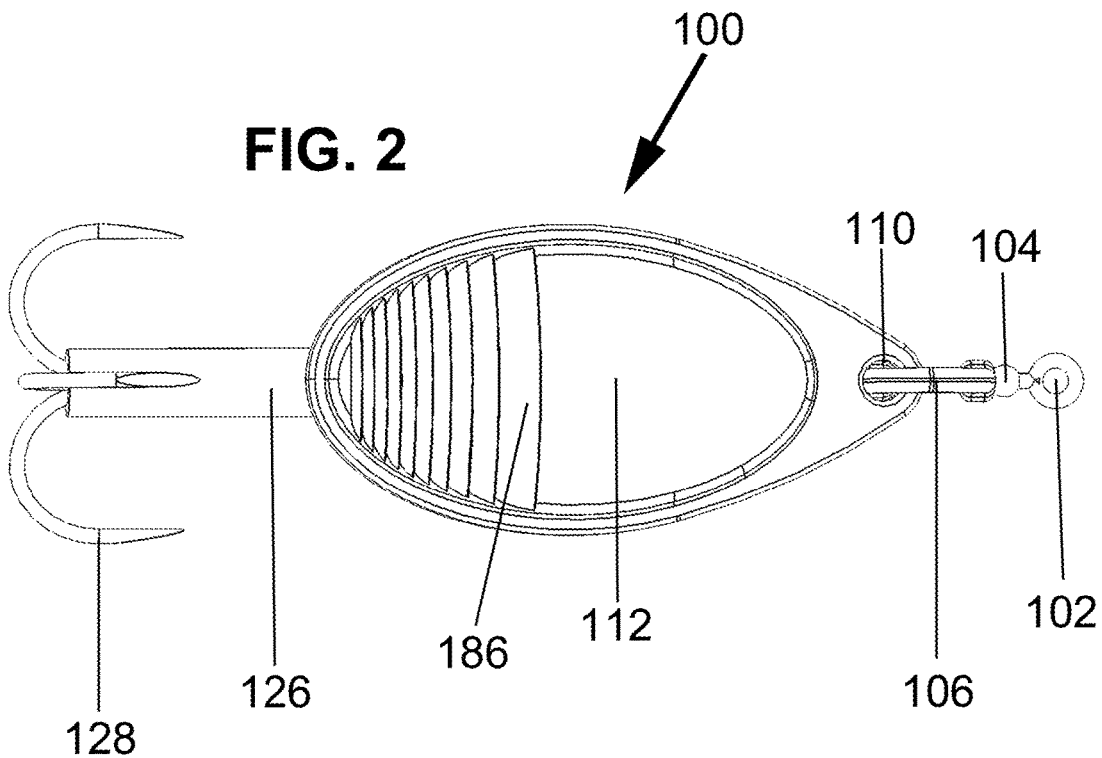
FIG. 2 is a top view of the spinnerbait fishing lure shown in FIG. 1.
Figure 5:
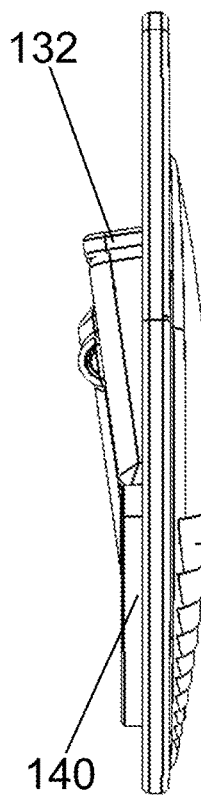
FIG. 5 is a left side vertical view of the spinnerbait fishing lure polymer light transmission blade.
Figure 6:
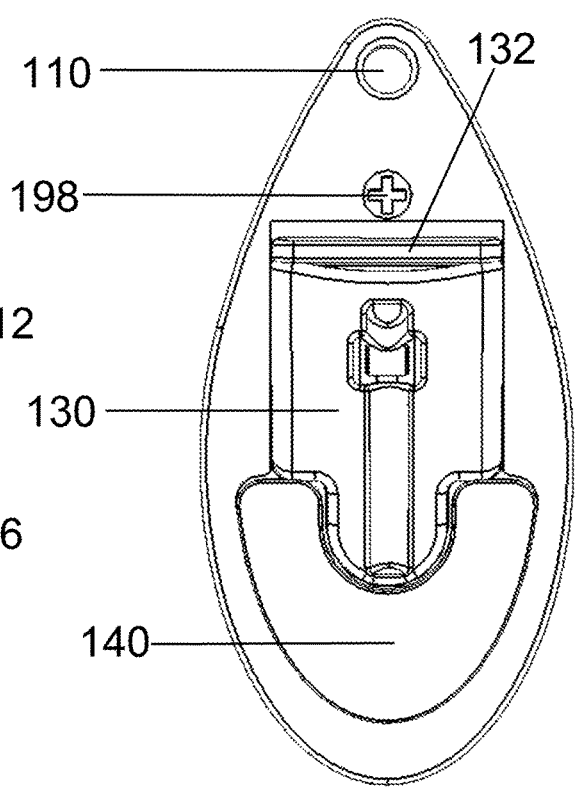
FIG. 6 is a back view of the spinnerbait fishing lure polymer light transmission spinnerbait blade shown in FIG. 5

Embodiments described herein relate to an illumination system for maintaining the color, color pattern and iridescence of spinnerbait fishing lures utilizing a polymer light transmission illumination medium. The polymer light transmission medium can be molded to form a specific design, size, shape, and desired weight of the spinnerbait blade and or aquatic lure body. Colorants, florescent or reflective particles and other materials can be added to the polymer light transmission medium to enhance its appearance. Additionally, in the molding process patterns such as a specific fish scale pattern can be created providing iridescence around each scale to achieve a desired appearance.

The light source can be embedded in or located proximate to the polymer light transmission medium such that light from the light source is amplified, intensified, and dispersed along the polymer light transmission medium to provide a natural looking color, color pattern and luminescence to the spinnerbait fishing lure. A power source, such as a battery, can be used to power the light source.

The color, color pattern and iridescence of spinnerbait fishing lures may change dramatically underwater because water has a density of 1000 kg/m^3 compared to air that averages 1.275 kg/m^3. Water is 784 more dense than air and acts as a selective color filter causing loss of sunlight, color, contrast and iridescence. The way light transforms under water is responsible for the typical "under water atmosphere" creating challenges for the angler with visual lure performance. Spinnerbait fishing lures can attract fish or other aquatic animals by motion, sound, vibration, and visual appearance. Motion, sound and vibrations can be altered by the size, shape and weight of the rotating blade, water currents and the angler's ability to retrieve the spinnerbait lure. What the angler cannot influence is the visual appearance of the spinnerbait lure once it enters the water. As light passes through water it is absorbed and reduced in the process. This light absorption causes spinnerbait fishing lures to lose their color as they go deeper down or further away as wavelengths that make up color perception are absorbed differently underwater.

Many fish see in color and use sight almost 100 percent in their selection of food as sight may be their dominant sense. It can be appreciated that maintaining the color, color pattern and iridescence to spinnerbait lures at any depth fished, during loss of sunlight, in degrading water clarity, unfavorable weather conditions, and at dusk, dawn or night will catch more fish as the visual lure performance of other spinnerbait lures are diminished or completely lost under these adverse conditions.

The polymer light transmission medium must have an acceptable refractive index in order to properly amplify the light source in a multidirectional manner through the transmission medium to maintain the color, color pattern and iridescence of the spinnerbait fishing lure. In optics the refractive index or index of refraction of an optical medium is a number that describes how light propagates through that medium. The polymer light transmission medium should be a generally translucent, clear, or transparent polymer medium.

An ultraviolet protectant additive may be introduced in order to maintain and protect the clarity of the polymer light transmission medium to avoid discoloration. The polymer light transmission medium has a specific gravity which is the ratio of the density (mass of a unit volume) of a substance to the density (mass of the same unit volume) of a reference substance which is usually distilled water at 1.0 kg/dm$^3$. The density of the polymer light transmission medium can range below or above 1.0 kg/dm$^3$ allowing the spinnerbait fishing lure to have more buoyancy or to sink at different rates of speed without the use of lead. The "safety-pin" or overhead blade style spinnerbait employs a lead head integrated with a hook allowing the safety-pin spinnerbait to sink. The United States Fish and Wildlife Service established regulations (50 C.F.R. 20) effective Aug. 26, 1990 prohibiting the use of lead shot for waterfowl hunting in all 50 states, Puerto Rico, and the Virgin Islands. The EPA has been also concerned about the water and soil contamination caused by the deposition of thousands of tons of lead. On Aug. 3, 2010 a Petition for Rulemaking under the Toxic Substance Control Act was filed by The Center for Biological Diversity, American Bird Conservancy, Association of Avian Veterinarians, Project Gutpile and Public Employees for Environmental Responsibility to ban lead from fishing tackle. As described above this invention allows all styles of spinnerbait fishing lures to sink at different rates of speed without the use of lead because the density of the polymer light transmission medium can exceed 1.0 kg/dm$^3$.

The LED coupled with the polymer light transmitting medium can produce any visible light colors as well as ultraviolet and infrared (IR). The amount of light emitted from an LED is quantified by a single point, on-axis luminous intensity value (Iv) and its intensity is specified in terms of a millicandela rating (mcd). When optically coupling the LED with the polymer light transmitting medium the luminous intensity which is affected by the amount of current passing through the LED and its viewing angle must be considered to generate an acceptable color, color pattern and iridescence to the spinnerbait fishing lure respective to its size, configuration and refractive index. It should be emphasized that the LED is not seen in the spinnerbait lure blade or aquatic body as only the polymer transmission medium's illumination from the LED is visible. The spirit of the invention is to manifest, enhance or maintain the surface appearance of the spinnerbait lure underwater at any water depth fished under any and all adverse water clarity conditions.

As light passes through water, it may be at least partially or fully absorbed and much of it lost in the process. This light absorption may cause spinnerbait fishing lures to lose its color as they go deeper down or further away, wavelengths that make up our perception of color are absorbed differently underwater. The length the wavelength changes underwater manifest how fast the color is absorbed. Red has the longest wavelength, more than 700 nm. One "nm" is equivalent one nanometer, which is on millionth of a meter. After red comes orange which is between 700 nm and 600 nm. After orange comes yellow and so on, all the way down to the blues and purples which are the shortest at around 400 nm. In clear water at 10 feet, red changes to a rusty orange color, at 20 feet red appears dark brown, at 40 feet red appears dark blue-green, and at 60+ feet red turns black. Orange maintains its color at 10 feet, but at 20 feet turns a rust color, at 40 becomes dark brown, and at 60+ feet turns black. The color yellow remains unaffected up to 20 feet but transforms to pale yellow at 40 feet and then turns white at 60+ feet. Green turns to pale green at 60 feet but blue manifest little change except at the greatest depths. Neon colors remain truer at depth but on a cloudy day or when light intensity diminishes, reds are the first colors to go, followed by orange, yellow, green, and blue. The distance light rays travel underwater limits the vision of fish and in dark, murky water their vision is very poor. Creating an illumination technology to allow the spinnerbait lure to mimic its surface counterpart underwater without observing the light source is the spirit of this invention.

Embodiments of the spinnerbait fishing lure can also include a compartment adapted to house the power source and some or all of the associated circuitry for the light source. In some embodiments, the light source is activated with a switch, while in other embodiments the light source is activated upon installation of the power source into the compartment.

FIGS. 1-4 shows one example of a spinnerbait fishing lure 100, an in-line style spinnerbait including a polymer light transmission medium spinner blade 112 connected by the spinner blade eyelet 110 to the clevis 106. Clevis 106 which is held into place by the first spinner bead 104 and double head spinner bead 116 rotates 360 degrees in a frictionless manner around wire shaft 108 allowing polymer light transmission medium spinner blade 112 to rotate at different rates of speed in either a clockwise or counter clockwise direction depending on retrieval speed and water current conditions. Polymer light transmission medium spinnerbait blade 112 also has freedom of movement along the axis of clevis 106 in a vertical and lateral direction.

Spinnerbait bulb weight 114, located between first wire shaft rear eyelet 122 and second spinner bead 118, is designed to equalize the weight along wire shaft 108 and create increased water flow directed toward treble hook 128. Spinnerbait bulb weight 114 can be fabricated from various types of materials including but not limited to: plastic, ceramic, rubber, metal or wood. Treble hook 128 could also be a single hook, a double hook, or any combination of fishing hooks.

As shown in FIGS. 1-4, wire shaft 108 is configured to allow fishing line to connect to first wire shaft front eyelet 102. Treble hook 128 is configured to be connected to first wire shaft rear eyelet 122 by treble hook eyelet 124. This configuration allows the strength of wire shaft 108 to withstand the force applied between the fishing line and treble hook 128. Along the longitudinal direction of wire shaft 108, double head spinner bead 116 gives balance to spinnerbait fishing lure 100 compensating for the weight of treble hook 128.

Wire shaft cover 120 allows spinnerbait polymer light transmission medium spinner blade 112 to rotate smoothly around wire shaft 108 without striking treble hook 128. Treble hook 128 also has treble hook cover 126 which helps hide hook 128 and create additional buoyancy as spinnerbait fishing lure 100 moves through the water. U weight 140 and spinner blade ridges 186 allow polymer light transmission medium spinner blade 112 to rotate at an increased speed creating additional centrifugal force. The U weight may be varied in weight and size to create different rates of rotation and vibration to the spinnerbait lure 100.

FIG. 4 is a front side horizontal cross-sectional view of the fishing lure 100 depicted in FIG. 3 showing the components arranged from the first wire shaft front eyelet 102 through to the treble hook 128. The illumination system components are also shown as they are aligned within the polymer light transmission medium spinnerbait blade 112 and are described in greater detail below.

FIGS. 5-9 show the illumination system components of the light transmission medium spinner blade 112. Polymer light transmission medium spinner blade 112 includes polymer light transmission medium front housing 160 and polymer light transmission medium rear housing 130 both which can be molded with colorizers, reflective or other materials to maintain the color, color pattern and iridescence of desired polymer light transmission medium spinner blade 112. Furthermore, light transmission medium spinner blade 112 win non-translucent portions, such as those resembling eyes, or other configurations.

Figure 7:
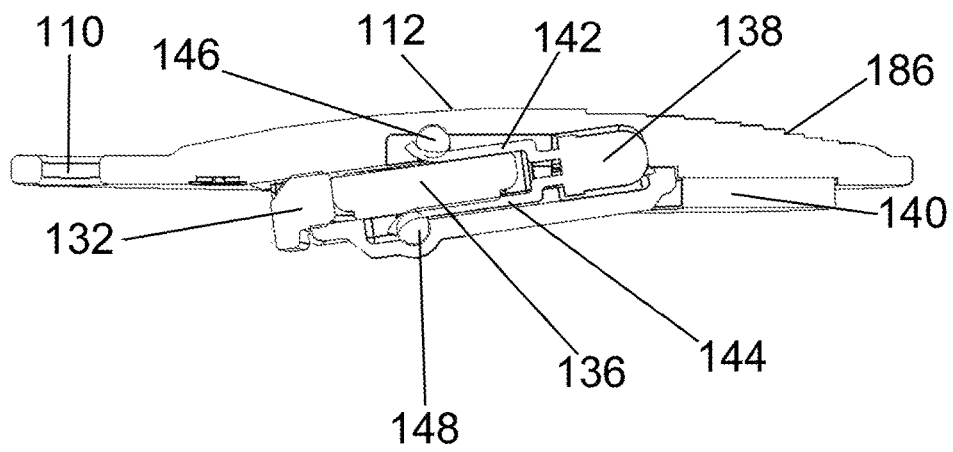
FIG. 7 is a front side vertical cross sectional view shown in FIG. 5.

As shown in FIG. 7, the light emitting diode (LED) 138 has positive Anode terminal pin 142 placed against its rubber compression cord 146 and negative Cathode terminal pin 144 placed against its rubber compression cord 148. The two compression cords allow battery 136 to push against terminal pins to activate LED 138.

As further shown in a front and back exploded view of polymer light medium spinnerbait blade 112 in FIG. 8-9, LED is positioned between LED rear housing insertion channel 150 and LED front housing insertion channel 152. To eliminate confusion and simplify the LED 138 insertion process, the length and curvature of the light emitting diode positive Anode terminal pin 142 is designed to fit into polymer light transmission medium spinner blade front housing insertion channel 152 and negative Cathode terminal pin 144 is designed to fit into polymer light transmission medium spinner blade rear housing insertion channel 150. The rubber compression cord for LED Anode terminal pin 146 fits into rubber compression cord insertion channel front housing 156 and rubber compression cord for LED Cathode terminal pin 148 fits into rubber compression cord insertion channel rear housing 154.

It is to be appreciated that LED 138 and related components could be reversed from the above noted description and that various designs in spinnerbait blade shapes, sizes and weights may be used with the various embodiments.

Battery 136 fits into the battery cell boot 132 and is protected from water intrusion once battery cell boot 132 is pushed downward into battery cell boot insertion cavity 158. Battery cell boot 132 can be made from vulcanized rubber, thermoplastic rubber, or thermoplastic elastomer such as Santoprene™, or any other material which allows battery 136 to be removed, replaced and or reversed easily due to the strength and flexibility of the cell boot material. Battery cell boot 132 design also allows battery 136 to slide up and down inside the battery cell boot insertion cavity 158 without falling out through the use of battery cell boot footing seals 134. Battery 136 could be any type of power source including but not limited to primary batteries or secondary batteries.

If the angler chooses not to activate the illumination feature of the polymer light transmission medium spinner blade 112, the angler can reverse the position of battery 136 so the negative side of battery 136 faces positive battery indicator 198. To activate the illuminated feature of polymer light transmission medium spinner blade 112 the above mentioned procedure is reversed so the positive side of battery 136 faces positive battery indicator 198.

Figure 16:
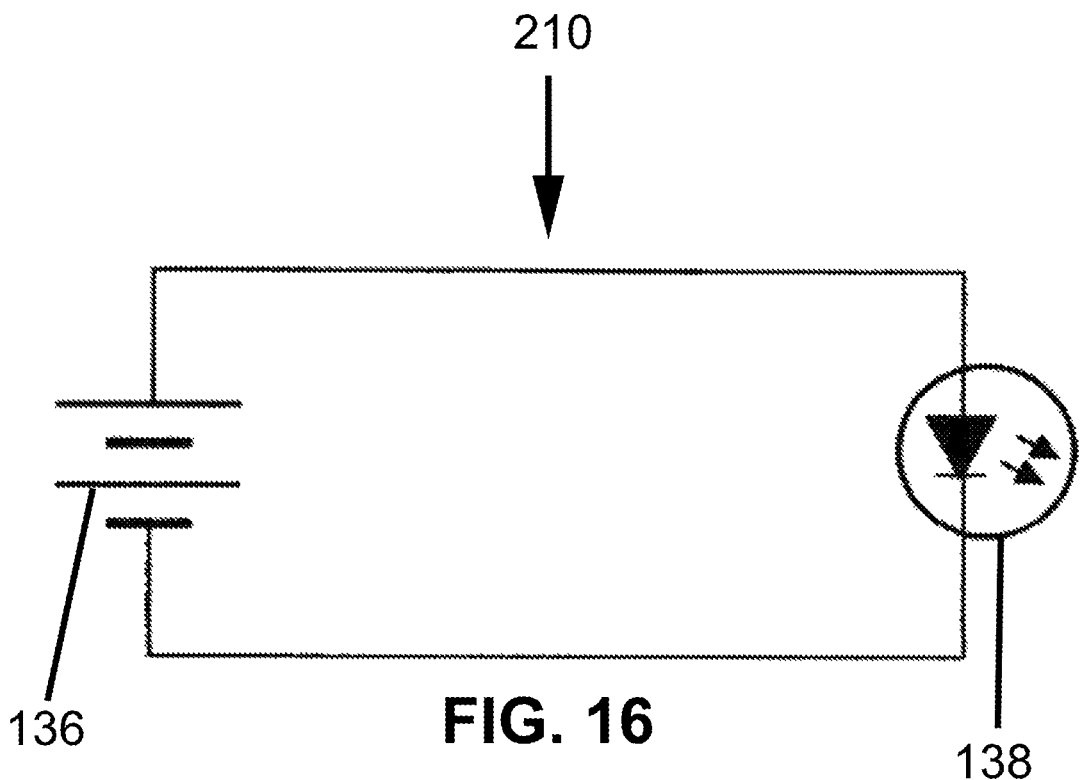
FIG. 16 is an electrical schematic diagram of a first circuit for an illumination system.
Figure 17:
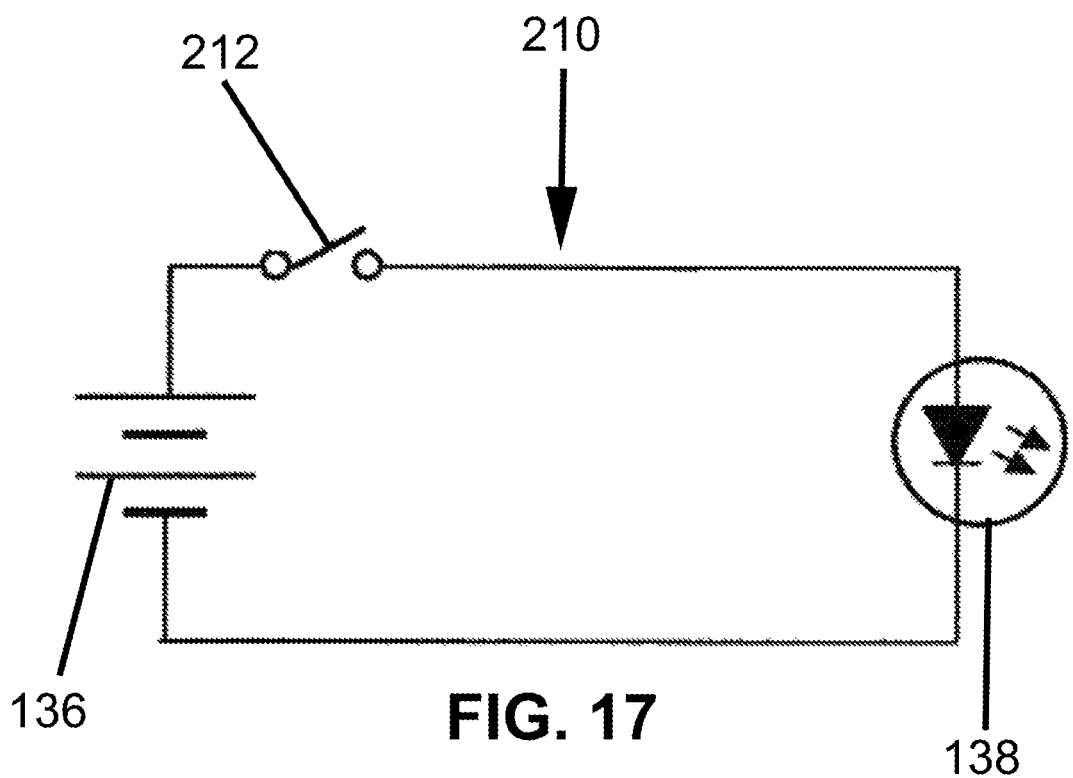
FIG. 17 is an electrical schematic diagram of a second circuit for an illumination system.

The illumination system circuit 210 shown in FIG. 16 may be implemented in spinnerbait fishing lure 100. As such, LED 138 is activated once battery 136 is correctly positioned into battery cell boot 132 and inserted into battery cell boot insertion cavity 158 or 178 shown in FIG. 14. As described above and with reference to other embodiments additional components can be included in the illumination system circuit 210, such as switch 212 shown in FIG. 17.

Figure 10:
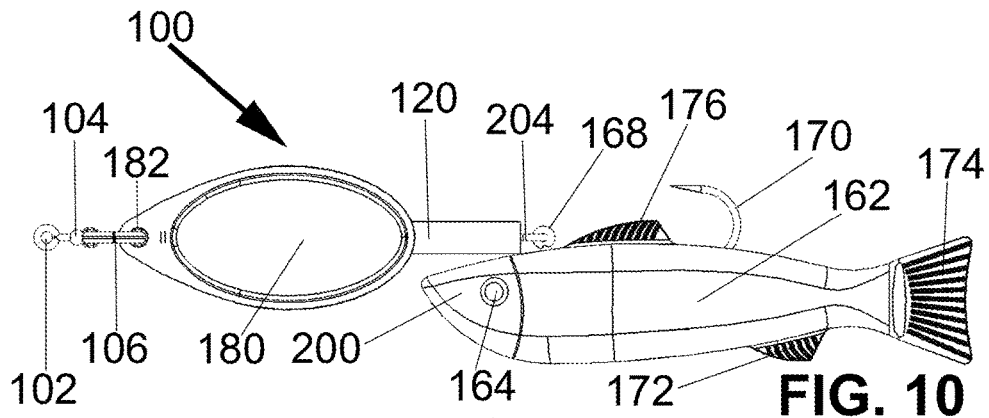
FIG. 10 is a right side view of a second embodiment of a spinnerbait fishing lure including a spinnerbait polymer light transmission medium fish body and illumination system.
Figure 11:
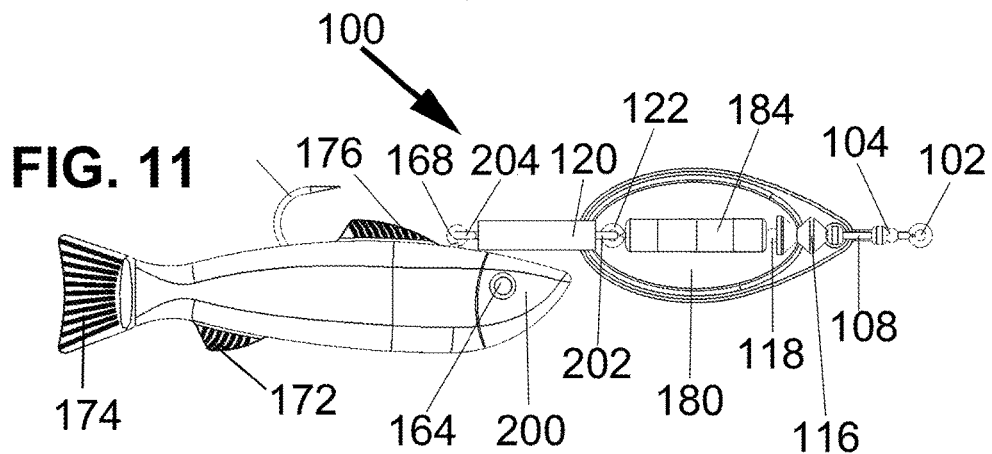
FIG. 11 is a left side view of FIG. 10.

FIGS. 10-11 show another example of spinnerbait fishing lure 100, also an in-line style spinnerbait, which incorporates polymer light transmission medium fish lure body 162, which may be configured as generally elongate. Both the present embodiment and the prior embodiment have first wire shaft 108 with front eyelet 102 and rear eyelet 122, a first spinner bead 104, clevis 106, double head spinner bead 116, and second spinner bead 118. However, in the second embodiment spinnerbait blade 180 is made of metal and is connected to the clevis 106 by metal spinner blade eyelet 182. Spinner blade body 184 has been added to first wire form 108 and second wire shaft 206 has been included having front eyelet 202 connected to rear eyelet 122 of first wire form 108. Second wire shaft 206 has cover 120 which allows the addition of polymer light transmission medium spinnerbait fish body 162 by connecting second wire shaft rear eyelet 204 to classic hook eyelet 168. Classic hook 170, located below dorsal fin 176, is connected to second wire shaft rear eyelet 204 by classic hook eyelet 168 allowing polymer light transmission medium fish lure body 162 to move freely through the water both vertically and horizontally.

Figure 12:
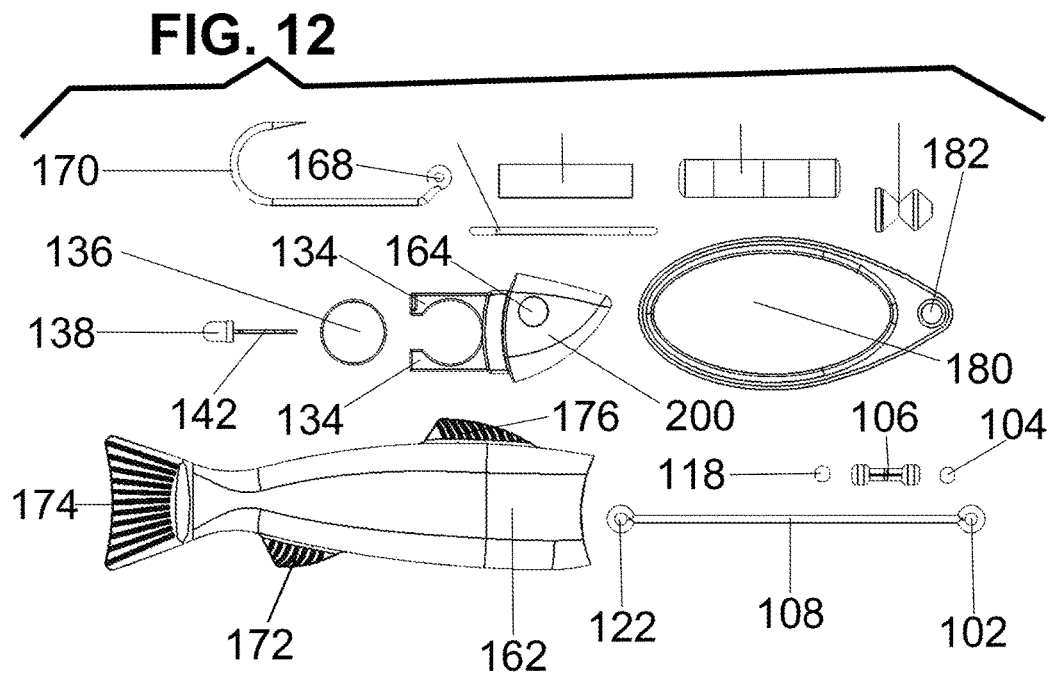
FIG. 12 is a left side exploded view of FIG. 11.

FIG. 12 is an exploded view of FIG. 11 showing in greater detail the components described above and the illumination system components of the polymer light transmission medium fish body 162 described in greater detail below in FIGS. 13-14.

The polymer light transmission medium described and depicted herein can be made from various polymer light transmitting mediums having any number of optical attributes including but not limited to an acceptable refractive index for interacting and/or interfacing with the light source and/or transmitting or otherwise propagating light emitted by one or more light sources. In one example, the polymer light transmitting medium may include translucent, clear, or transparent properties, such that the material allows light to pass there through. Depending on the specific illuminating attributes utilized in any given embodiment, the polymer light transmitting mediums can interact and/or interface with the light sources as well as with the ambient light in the water, if any, to create a particularized illumination inside and/or in close proximity to the spinnerbait fishing lure body and or spinnerbait blade. Further, certain polymer light transmitting mediums may include one or more additional optical attributes such as, but not limited to: (1) luminescence, whereby the polymer light transmitting mediums interact with the light sources to produce a light wavelength having a soft glow of a desired intensity and/or dispersion; (2) iridescence, whereby the polymer light transmitting mediums interact with and/or otherwise split light emitted by the light sources to produce a spectrum of light with more than one wavelength; for example, but not limited to, one having a rainbow like refraction pattern; (3) fluorescence, whereby the polymer light transmitting mediums interact with the light sources to produce a light wavelength having a bright radiant glow; and (4) reflectivity, whereby the polymer light transmitting mediums reflect light at one or more wavelengths produced by the light sources without altering the wavelength of the light. Other optical properties may also be provided in the polymer light transmitting mediums. Such properties may operate upon, influence, distort or otherwise alter the phase, amplitude, wavelength and/or other properties of one or more beams of light.

More particularly, the light source can be embedded in or located proximate to the polymer light transmission medium in order to amplify, intensify, and/or disperse light along the polymer light transmission medium to maintain a color, a color pattern and iridescence to the spinnerbait fishing lure. The polymer light transmission medium may be made from various polymers, such as polyolefins, polypropylenes, ethylene vinyl acetates, clear aliphatic thermoplastic polyurethanes, and other polymer materials possessing the specifications previously discussed above. Combinations, mixtures and additives with the above materials mentioned may allow specific optical and buoyancy properties to be achieved.

Figure 15:
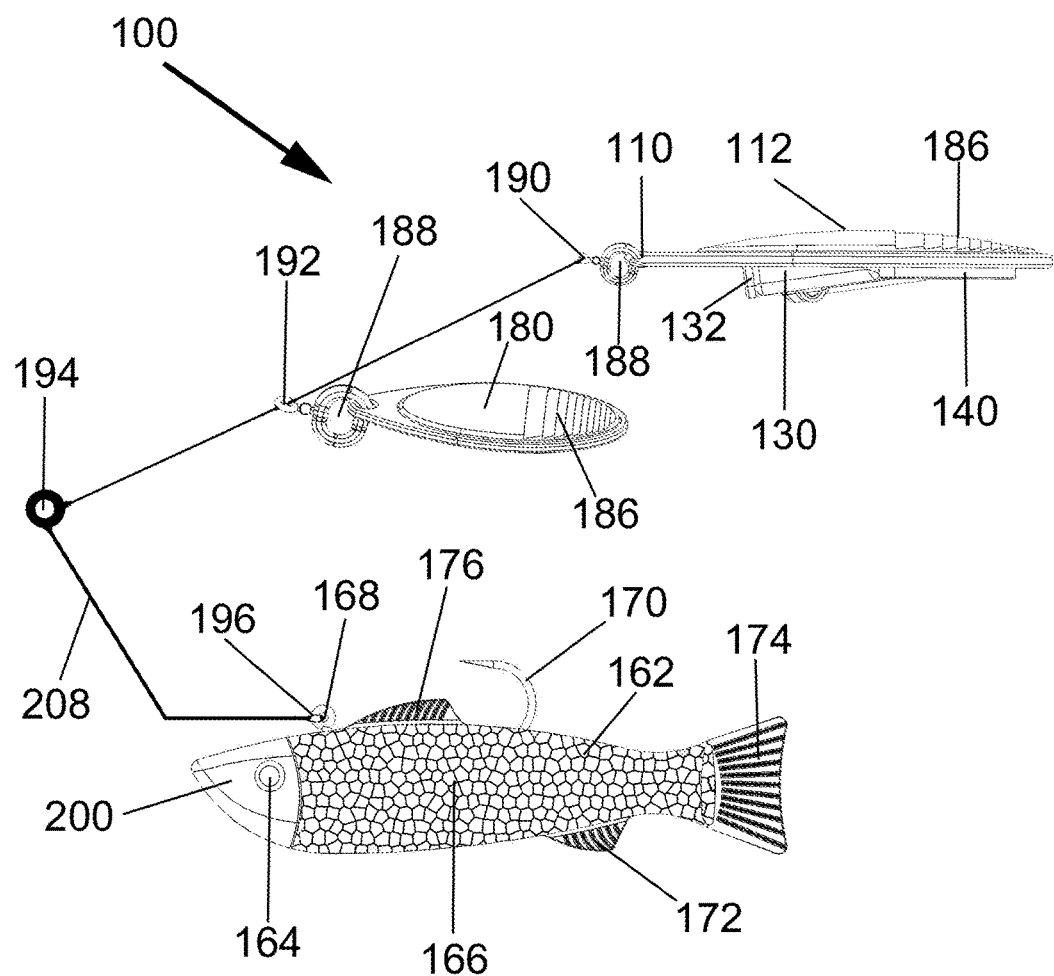
FIG. 15 is a right side view of a third embodiment of the spinnerbait fishing lure, a safety-pin type spinnerbait; including a polymer light transmission spinner blade and illumination system, a metal spinner blade, a polymer light transmission medium fish body and illumination system.

In FIGS. 10-15 dorsal fin 176, the anal fin 172, and configuration of the caudal fin or tail 174 help stabilize polymer light transmission medium fish lure body 162 from rolling side to side as the angler retrieves this embodiment of an in-line spinnerbait through the water. To maintain scale and fin pattern iridescence appearance on polymer light transmission medium fish body 162, a depression can be molded into the polymer light transmission medium allowing an iridescent fin and scale pattern to be created. Scale pattern 166 shown in the FIG. 15 is one example of the numerous scale pattern designs that can be replicated on the polymer light transmission medium which can also be colorized and have reflective material added to maintain the exact color and iridescent appearance of the desired bait. Because of pressures, temperatures and molding time required during the injection molding process only certain reflective, such as customized aluminum based materials may be a better material to be used to avoid discoloration of the polymer transmission material.

FIG. 14 is an exploded isometric view of FIG. 13 showing fish head grip cell boot 200 which holds battery 136 in place. Positive battery indicator 198 shows the proper alignment for the insertion of LED 138 into LED insertion cavity 178. Battery cell boot footing seals 134 ensures that once fish head grip cell boot 200 is inserted into LED insertion cavity 178 a water tight seal is achieved.

FIG. 15 shows another embodiment of spinnerbait fishing lure 100 a safety-pin type style with wire form 208. Polymer light transmission medium spinner blade 112 is attached to split ring swivel 188 which is attached to first wire form eyelet 190 at the top of wire form 208. Light transmission medium spinner blade 112 may include a light transmissive medium and/or material. Split ring swivel 188 rotates freely in either a clockwise or counter clockwise direction allowing polymer light transmission medium spinner blade 112 to rotate at different rates of speed depending on the angler's rate of retrieve and currents encountered in the water.

Metal spinner blade 180 is also attached to form 208 in the same manner as described above. The fishing line is connected to wire form 208 at third wire form eyelet 194. Polymer light transmission medium fish lure body 162 is attached to the bottom of wire form 208 by forth wire form eyelet 196 and classic hook eyelet 168 allowing polymer light transmission medium fish lure body 162 to move freely through the water laterally and vertically resembling the movement of live bait.

Various arrangements and embodiments concerning an illumination system for a spinnerbait fishing lure have been described which may include a power source, a light source, and a polymer light transmission medium and/or material. The spinnerbait fishing lure can include a polymer light transmission medium rotating blade, fish body or other aquatic animal and can be formed in various ways and operated in various manners. For instance, spinnerbait fishing lure 100 could comprise two polymer light transmission medium spinner blades 112 attached to a polymer light transmission medium spinner fish body 162 each separately containing LEDs 138. It will also be appreciated that the features described in connection with each arrangement and embodiment are interchangeable so that many variations beyond those specifically described are possible. Therefore, although various representative embodiments have been described above with a certain degree of particularity, those skilled in the art could make numerous alterations to the disclosed embodiments without departing from the spirit or scope of the inventive subject matter set forth in the specification and claims.

All directional references (e.g., upper, lower, upward, downward, left, right, back, front, isometric, transparent, exploded, leftward, rightward, top, bottom, above, below, vertical, horizontal, clockwise, and counterclockwise) are only used for identification purposes to aid the reader's understanding of the embodiments, and do not create limitations, particularly as to the position, orientation, or use of the spinnerbait fishing lure unless specifically set forth in the claims. Joinder references (e.g., attached, coupled, adjacent, connected, and the like) are to be construed broadly and may include intermediate members between a connection of elements and relative movement between elements. As such, joinder references do not necessarily infer that two elements are directly connected and in fixed relation to each other.

In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A spinnerbait blade comprising:
a translucent body;
an aperture in the body through which to affix a fish hook;
a moveable member that holds a power source;
a power chamber housed within the translucent body having an opening in a distal side of the translucent body to receive the moveable member; and
a light-emitting diode housed within the translucent body and having an anode terminal pin and a cathode terminal pin that extend into the power chamber and that engage with the power source when the moveable member is received in the power chamber.

2. The spinnerbait blade of claim 1 wherein the moveable member comprises stoppers that prevent the moveable member from being totally disengaged from the power chamber.

3. The spinnerbait blade of claim 2 further comprising grooves on a proximal side of the translucent body to disperse light emitted by the light-emitting diode.

4. The spinnerbait blade of claim 1 wherein the translucent body comprises a polymer-based light transmission medium.

5. The spinnerbait blade of claim 1 wherein the power source comprises a battery.

6. The spinnerbait blade of claim 5 wherein the moveable member flexes to allow the battery to be removed.

7. A fishing lure comprising:
a wire member;
a clevis rotationally affixed to the wire member;
a spinnerbait blade affixed to the clevis, wherein the spinnerbait blade comprises:
a translucent body;
an aperture in the body through which to affix the clevis;
a moveable member that holds a power source;
a power chamber housed within the translucent body having an opening in a distal side of the translucent body to receive the moveable member; and
a light-emitting diode housed within the translucent body and having an anode terminal pin and a cathode terminal pin that extend into the power chamber and that engage with the power source when the moveable member is received in the power chamber.

8. The fishing lure of claim 7 wherein the moveable member comprises stoppers that prevent the moveable member from being totally disengaged from the power chamber.

9. The fishing lure of claim 8 further comprising grooves on a proximal side of the translucent body to disperse light emitted by the light-emitting diode.

10. The fishing lure of claim 7 wherein the translucent body comprises a polymer-based light transmission medium.

11. The fishing lure of claim 7 wherein the power source comprises a battery.

12. The fishing lure of claim 11 wherein the moveable member flexes to allow the battery to be removed.

13. A method comprising:
affixing a clevis to a wire member; and
affixing a spinnerbait blade to the clevis, wherein the spinnerbait blade comprises:
a translucent body;
an aperture in the body through which to affix the clevis;
a moveable member that holds a power source;
a power chamber housed within the translucent body having an opening in a distal side of the translucent body to receive the moveable member; and
a light-emitting diode housed within the translucent body and having an anode terminal pin and a cathode terminal pin that extend into the power chamber and that engage with the power source when the moveable member is received in the power chamber.

14. The method of claim 13 further comprising:
inserting the moveable member into the opening in the distal side of the translucent body; and
engaging the anode terminal pin and the cathode terminal pin of the light-emitting diode housed within the translucent body with the power source when the movable member is received in the power chamber.

15. The method of claim 13 wherein the moveable member comprises stoppers that prevent the moveable member from being totally disengaged from the power chamber.

16. The method of claim 15 further comprising:
preventing the moveable member from being totally disengaged from the power chamber with the use of stoppers.

17. The method of claim 13 wherein the translucent body has grooves on a proximal side to disperse light emitted by the light-emitting diode.

18. The method of claim 13 wherein the translucent body comprises a polymer-based light transmission medium.

19. The method of claim 13 wherein the power source comprises a battery.

20. The method of claim 13 wherein the moveable member flexes to allow the battery to be removed.

* * * * *